United States Patent
Flint et al.

(10) Patent No.: US 10,780,757 B2
(45) Date of Patent: Sep. 22, 2020

(54) DAMPER WITH VEHICLE INTERFACE ADAPTER

(71) Applicant: Hitachi Automotive Systems Americas, Inc., Harrodsburg, KY (US)

(72) Inventors: Jason Edward Flint, Newport, MI (US); Trevor Daniel Haight, Waterford, MI (US); Atsushi Maeda, Fujisawa (JP); Masato Suehiro, Komae (JP)

(73) Assignee: HITACHI AUTOMTIVE SYSTEMS AMERICAS, INC., Harrodsburg, KY (US)

( * ) Notice: Subject to any disclaimer, the term of this patent is extended or adjusted under 35 U.S.C. 154(b) by 0 days.

(21) Appl. No.: 16/029,801

(22) Filed: Jul. 9, 2018

(65) Prior Publication Data
US 2020/0009933 A1    Jan. 9, 2020

(51) Int. Cl.
| | | |
|---|---|---|
| *B60T 15/06* | (2006.01) | |
| *B60G 13/00* | (2006.01) | |
| *F16F 9/06* | (2006.01) | |
| *F16F 9/50* | (2006.01) | |
| *F16F 9/54* | (2006.01) | |
| *B60G 13/06* | (2006.01) | |
| *B60G 17/08* | (2006.01) | |

(52) U.S. Cl.
CPC .......... *B60G 13/003* (2013.01); *B60G 13/06* (2013.01); *B60G 17/08* (2013.01); *F16F 9/062* (2013.01); *F16F 9/50* (2013.01); *F16F 9/54* (2013.01); *B60G 2204/128* (2013.01); *B60G 2206/41* (2013.01); *B60G 2500/114* (2013.01); *B60G 2800/162* (2013.01); *F16F 2228/066* (2013.01)

(58) Field of Classification Search
CPC ...... B60T 13/003; B60T 13/06; B60T 15/067; B60T 15/068; B60T 17/08; B60T 2204/128; B60T 2206/41; B60T 2500/114; B60T 2800/162; F16F 9/062; F16F 9/50; F16F 9/54; F16F 2228/066
USPC .................... 188/266.6, 315, 322.14, 321.11
See application file for complete search history.

(56) References Cited

U.S. PATENT DOCUMENTS

| | | | | |
|---|---|---|---|---|
| 5,113,979 A | * | 5/1992 | Driessen ................ | B60G 17/08 188/280 |
| 7,997,588 B2 | * | 8/2011 | Ohnuma ............ | B60G 21/0556 280/5.519 |
| 8,307,965 B2 | * | 11/2012 | Foster ..................... | F16F 9/516 188/281 |
| 8,408,569 B2 | * | 4/2013 | Keil ...................... | F16F 9/3235 188/322.19 |

(Continued)

*Primary Examiner* — Thomas W Irvin
(74) *Attorney, Agent, or Firm* — Mattingly & Malur, PC

(57) ABSTRACT

Some examples include a damper having an outer tube with a piston reciprocally mounted on an interior of the outer tube. A dampening force generating mechanism may be mounted on the outer tube within a threshold distance from a first end of the outer tube to control a dampening property of the piston. In addition, a vehicle interface adapter may seal the first end of the outer tube. The vehicle interface adapter may include an insertion portion extending outward from the first end of the outer tube. The insertion portion is able to be inserted into a cup-shaped portion of a vehicle attachment receptacle. The insertion portion may have a cylindrical wall forming a cylinder that is aligned coaxially with the outer tube.

19 Claims, 3 Drawing Sheets

(56) References Cited

U.S. PATENT DOCUMENTS

| | | | | |
|---|---|---|---|---|
| 8,479,894 B2* | 7/2013 | Yabe | .................. | F16F 9/348 |
| | | | | 188/266.6 |
| 8,798,859 B2* | 8/2014 | Uchino | .................. | B60G 17/06 |
| | | | | 701/40 |
| 10,363,789 B2* | 7/2019 | McIlrath | .............. | B60G 15/067 |
| 2008/0053764 A1* | 3/2008 | Tomonaga | ............ | B62K 25/08 |
| | | | | 188/315 |
| 2010/0072009 A1* | 3/2010 | Yamazaki | ............ | B60G 13/003 |
| | | | | 188/269 |
| 2011/0140323 A1* | 6/2011 | Kwon | .................... | B60G 15/12 |
| | | | | 267/64.24 |
| 2012/0305348 A1* | 12/2012 | Katayama | .............. | B60G 17/08 |
| | | | | 188/266.2 |
| 2012/0305349 A1* | 12/2012 | Murakami | .............. | F16F 9/325 |
| | | | | 188/266.6 |
| 2013/0256070 A1* | 10/2013 | Murakami | .............. | F16F 9/185 |
| | | | | 188/315 |
| 2014/0291090 A1* | 10/2014 | Shimasaki | ................ | F16F 9/34 |
| | | | | 188/315 |

\* cited by examiner

DAMPER WITH VEHICLE INTERFACE ADAPTER

BACKGROUND

Vehicles such as automobiles, pickup trucks, and so forth, typically employ dampers (also referred to as shock absorbers and/or struts) to improve the ride for occupants of the vehicle. Dampers may commonly be attached between a vehicle body and the suspension system to control body movement or the like. For example, the dampers may help maintain the chassis of the vehicle in a near level position despite variations in the height of the road surface or motions of the vehicle.

Dampers may be active or passive. Active dampers (which may include semi-active dampers in this application) typically use an adjustable mechanism, such as a valve, for controlling a dampening effect of the damper. In some cases, the valve may be a solenoid-actuated valve that alters the flow of the hydraulic fluid inside the damper, thus changing the dampening characteristics of the dampers. For instance, the solenoid may be connected to a processor that sends commands depending on a control algorithm for controlling vehicle body movement. However, passive dampers and active dampers may have different configurations such that they may not be interchangeable in certain vehicle installations.

SUMMARY

Some implementations include arrangements and techniques for a damper having an outer tube with a piston reciprocally mounted on an interior of the outer tube. A dampening force generating mechanism may be mounted on the outer tube within a threshold distance from a first end of the outer tube to control a dampening property of the piston. In addition, a vehicle interface adapter may seal the first end of the outer tube. The vehicle interface adapter may include an insertion portion extending outward from the first end of the outer tube. The insertion portion is able to be inserted into a cup-shaped portion of a vehicle attachment receptacle.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The technology herein includes novel arrangements and techniques for a vehicle suspension damper, such as a shock absorber, strut, or the like. The damper may include a vehicle interface adapter for connecting the damper to a vehicle attachment receptacle. The vehicle interface adapter herein enables the use of a common vehicle attachment receptacle for both a passive damper having a first diameter and an active damper having a second diameter, different from the first diameter. In some examples, the vehicle interface adapter provides for the same tube diameter on the passive and active damper, which enables the same attachment cup to be used for both the passive damper and the active damper.

In addition, the vehicle interface adapter optimizes hydraulic performance of the damper by enabling a solenoid valve and solenoid mounted on the side of the damper to be disposed within a threshold distance of a bottom valve of the damper. For example, rather than having the solenoid valve located beyond the threshold distance and/or rather than having material removed from the vehicle attachment receptacle to allow the solenoid valve to be located within the threshold distance, implementations herein enable the solenoid to be positioned at a location on the damper that allows for optimal hydraulic performance.

In some examples, the vehicle interface adapter includes a cylindrical hollow adapter tube extending from a bottom of the active damper. For instance, the adapter tube may be welded, formed contiguously, or otherwise attached to the damper using any known techniques. The vehicle interface adapter also enables the damper to maintain the same tube outer diameter and annulus for the entire length of the damper interior by not mechanically reducing the damper tube outside diameter to connect to a vehicle attachment receptacle that is sized for a passive damper.

Thus, the vehicle interface adapter allows for use of a common vehicle attachment receptacle for both the active damper having a first diameter and a passive damper having a second diameter. Further, implementations herein are able to optimize the hydraulic replenishing circuit by allowing the solenoid valve to be located close to the bottom valve, e.g., within a threshold distance. Further, the adapter is hollow to provide weight savings and may include at least one paint drain hole to enable the vehicle interface adapter to be treated by various cleaning fluids, paint primer, and paint, while enabling the fluids to drain from the hollow interior of the vehicle interface adapter.

For discussion purposes, some example implementations are described in the environment of a vehicle suspension. However, implementations herein are not limited to the particular examples provided, and may be extended to other manufacturing environments, other applications, other configurations, as will be apparent to those of skill in the art in light of the disclosure herein.

Figure 1:
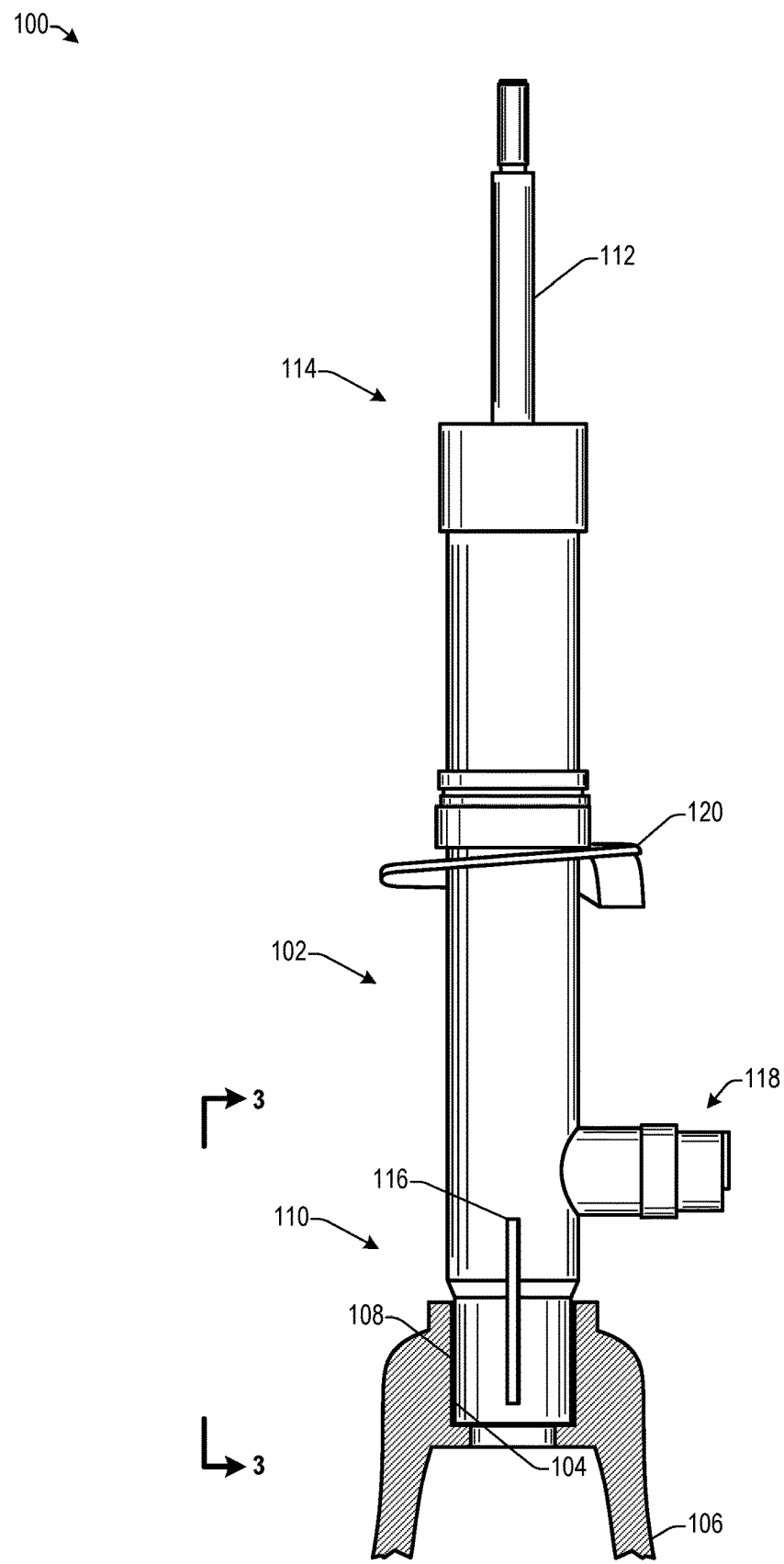
FIG. 1 illustrates an example damper and suspension attachment apparatus according to some implementations.

FIG. 1 illustrates an example apparatus 100 according to some implementations. In this example, the apparatus 100 includes a damper 102 assembled to a vehicle attachment receptacle 104 (illustrated in cross-section in this example). For example, the vehicle attachment receptacle 104 may be part of, or may otherwise connect to, a vehicle suspension system 106. As one example, the vehicle attachment receptacle 104 may connect to a control arm bushing (not shown in FIG. 1) or any of various other suspension components, depending on the design of the suspension of the vehicle in which the damper herein is installed. Accordingly, the damper 102 herein is not limited to connecting to a particular suspension component.

The damper 102 includes a vehicle interface adapter 108 on a first end 110 of the damper 102 and a piston rod 112 extending from a second end 114 of the damper 102. The vehicle interface adapter 108 is a hollow cylinder that extends downward from the first end 110 of the damper 102, and that is retained in the vehicle attachment receptacle 104.

The vehicle attachment receptacle 104 has a matching cylindrical cup-like shape for receiving the vehicle interface adapter 108.

As discussed additionally below with respect to FIG. 3, the vehicle attachment receptacle 104 may be split along one side to enable clamping of the vehicle interface adapter 108 within the vehicle attachment receptacle 104. The damper 102 includes a retention lug 116 that may fastened to the vehicle attachment receptacle 104 by clamping lugs (not shown in FIG. 1) for preventing the damper 102 from being withdrawn from the vehicle attachment receptacle 104 after the vehicle interface adapter 108 has been installed in the vehicle attachment receptacle 104.

In this example, the damper 102 is an active damper (e.g., a semi-active damper in this example) that includes a solenoid-actuated valve that may be actuated by a solenoid 118 for controlling the dampening properties of the damper 102. For instance, the damper 102 may be a shock absorber or strut for the vehicle suspension 106, and may be assembled into a module with a coil spring or air spring (not shown in FIG. 1). As several non-limiting examples, the damper 102 may have a configuration the same as, or similar to, the shock absorbers described in U.S. Pat. No. 8,413,774, to Hiroshi Murakami and/or U.S. Pat. No. 8,607,943 to Joel Donahue, which are incorporated herein by reference in their entireties. As is known in the art, a processor, electronic control unit, computer, or the like (not shown in FIG. 1) may send control signals to the solenoid 118 for changing the dampening properties of the damper 102 based on sensed vehicle and wheel conditions.

The vehicle interface adapter 108 on the damper 102 enables the solenoid to be placed in an optimal location with respect to the first end 110 of the damper 102. As discussed additionally below, the damper 102 may provide superior dampening performance by having the solenoid located within a threshold distance of the first end 110 (i.e., the bottom of the damper 102 in this example). Furthermore, the vehicle interface adapter 108 enables use of larger diameter active damper 102 with the same vehicle attachment receptacle 104 as passive damper (not shown in FIG. 1), while also achieving weight savings because a shorter active damper may be used in the same location as a longer passive damper.

Additionally, the damper 102 includes a spring support 120 in this example. For instance, in some installations of the damper 102, such as when the damper 102 is assembled together as unit with a coil spring (not shown in FIG. 1), a portion of the coil spring may contact the spring support 120 while another portion of the coil spring and the piston rod may be connected in contact with body of the vehicle. Alternatively, in other examples, the spring support 120 may be eliminated or may have a different configuration, depending on the configuration of the vehicle, the suspension, and the type of spring being used.

Figure 2:
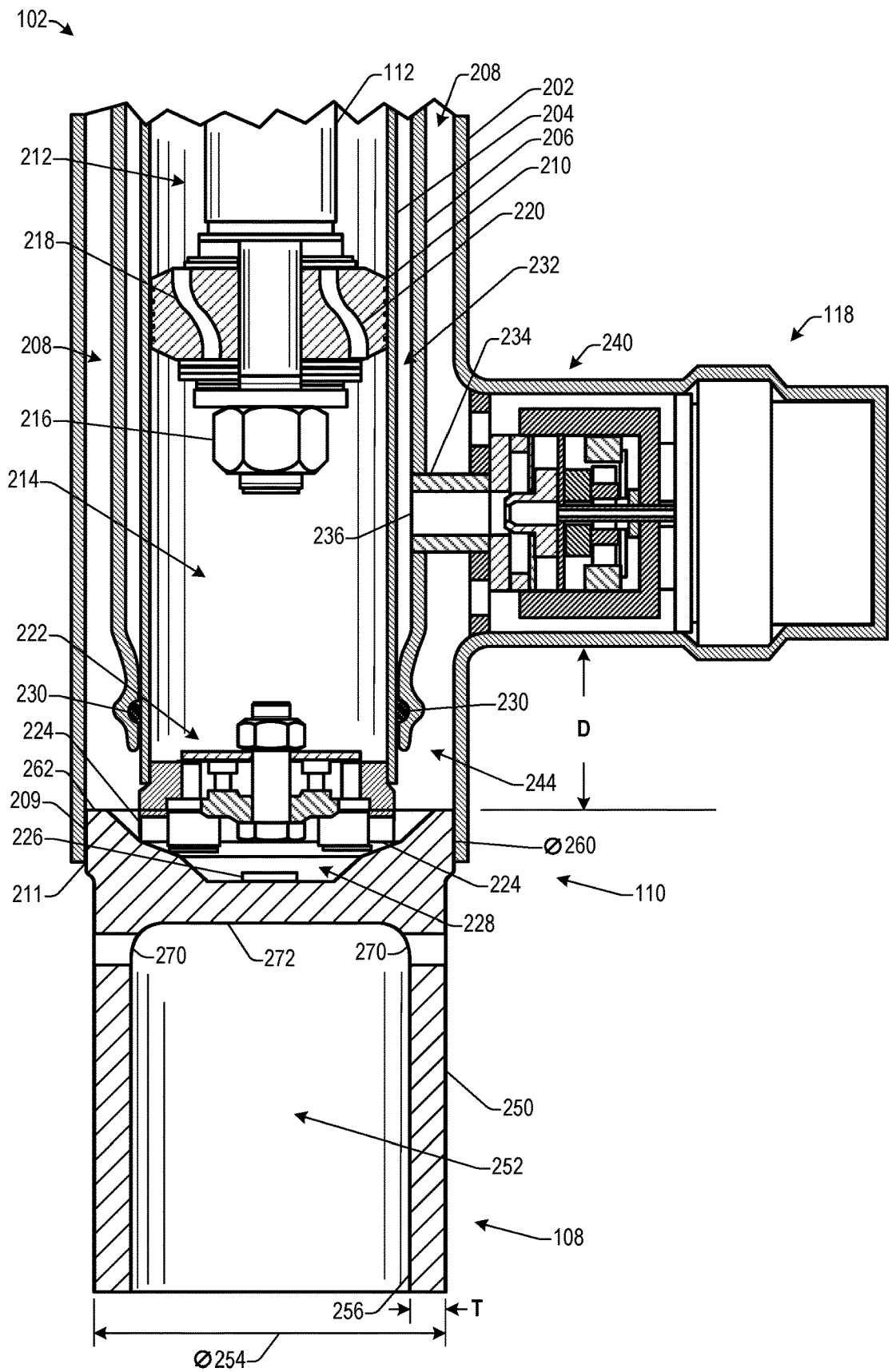
FIG. 2 illustrates an enlarged cross-sectional view of a damper with a vehicle interface adapter according to some implementations.

FIG. 2 illustrates an enlarged cross-sectional view of the damper 102 with the vehicle interface adapter 108 according to some implementations. In this example, the damper 102 includes an outer tube 202, an inner tube 204, and an intermediate tube 206. The inner tube and the intermediate tube 206 are mounted within the outer tube 202 to form an annular outer chamber 208 between the outer tube 202 and the intermediate tube 206 and the inner tube 204. The outer chamber 208 may serve as a reservoir for hydraulic fluid in some examples. The vehicle interface adapter 108 includes an upper perimeter 209 that seals to the outer tube 202. As one example, a weld may be formed at a joint 211. However, as mentioned above, numerous other techniques may be used for connecting the vehicle interface adapter 108 outer tube 202. For instance, the vehicle interface adapter 108 may be formed continuously with the outer to 202 or the like.

A piston 210 is reciprocally mounted in an interior of the inner tube 204 such that the interior of the inner tube 204 forms an upper chamber 212 above the piston 210, and a lower chamber 214 below the piston 210. The piston 210 is connected to one end of the piston rod 112 by a nut 216, and the other end of the piston rod 112 extends out of the damper 102 for connection to the vehicle, e.g., as discussed above with respect to FIG. 1. The piston 210 includes passages 218 and 220 for communication between the cylinder upper chamber 212 and lower chamber 214. As one non-limiting example, the passages 218 and 220 may be provided with valves, such as a check valve(s), disk valve(s), or the like that control the flow of hydraulic fluid through the piston 210 between the cylinder lower chamber 214 and the cylinder upper chamber 212 for controlling at least in part the dampening properties of the damper 102. For instance, as is known in the art, a valve (not shown in FIG. 2) in the piston 210 may open when the pressure of fluid in the cylinder upper chamber 212 reaches a predetermined pressure to relieve the fluid pressure to the cylinder lower chamber 214.

A base valve 222 is located in the first end 110 of the damper 102 and includes passages 224 for communication between the cylinder lower chamber 214 and the reservoir 208. The passages 224 may include a check valve(s) and disk valves for controlling fluid flow between the reservoir 208 and the cylinder lower chamber 214. For instance, a valve may open when the pressure of fluid in the cylinder lower chamber 214 reaches a predetermined pressure to relieve the fluid pressure to the reservoir 208. In some cases, a hydraulic fluid may be sealed in the cylinder upper and lower chambers 212, 214, and the hydraulic fluid and a gas may be sealed in the reservoir 208. Further, a magnet 226 may be located under the base valve 222 at the first end in a depression 228 formed in the upper surface of the vehicle interface adapter 108.

The intermediate tube 206 may be sealed to the inner tube 204 with a seal member 230 as illustrated at the lower end of the inner tube 204, with a similar seal member forming a seal between the intermediate tube 206 and the inner tube 204 at the upper end of the inner tube 204 (not shown in FIG. 2). Accordingly, an intermediate annular chamber 232 is formed between the inner tube 204 and the intermediate tube 206. A passage (not shown in FIG. 2) is formed in the wall of the inner tube 204 near the top of the damper 102 to enable fluid communication between the intermediate annular chamber 232 and the cylinder upper chamber 212.

In addition, a circular cylindrical connecting member 234 is attached to a lower part of the intermediate tube 206 to form an opening 236 into the intermediate annular chamber 232. The connecting member 234 projects sideward to connect to a solenoid valve 240 operable by the solenoid 118. The solenoid valve 240 serves as a dampening force generating mechanism that is operable to control the pressure in the intermediate annular chamber 232 and the cylinder upper chamber 212, thereby controlling, at least in part, the dampening properties of the damper 102. Examples of the solenoid valve are described in the patent incorporated by reference above. Further, implementations herein are not limited to any particular configuration for the solenoid valve 240, the base valve 222, the piston 210, or the tubular components 202, 204, 206 of the damper 102. Additionally, other types of dampening force generating mechanisms might be used in place of the solenoid 118 and solenoid valve 240, such as hydraulically actuated valves, pneumatically actuated valves, mechanically actuated valves, and so forth.

The solenoid 118 and solenoid valve 240 are located a distance D from the base valve 222. During operation of the damper 102, the hydraulic fluid goes through a pressure drop and returns to reservoir 208 through the base valve 222 at a lower pressure. Furthermore, the solenoid valve 240 is operable to control the level of pressure in the cylinder upper chamber 212. The inventors herein have determined that should the solenoid valve 240 be located farther from the base valve than a threshold distance (e.g., 10-15 cm as a non-limiting example), gas bubbles may develop in the hydraulic fluid, which can cause hydraulic noise issues and/or a lag in the dampening force. Accordingly, the vehicle interface adapter 108 enables the distance D of a fluid passage 244 from the base valve 222 to the solenoid valve 240 to be kept to a distance D that is less than the threshold distance.

As one example, if the solenoid valve 240 were to be positioned farther away from the base valve 222, the hydraulic performance of the damper 102 may be reduced because the hydraulic circuit replenishing path 244 is increased which can cause gas bubbles and/or delay in changing the dampening properties of the damper 102. Thus, the vehicle interface adapter 108 enables the solenoid valve 240 to be disposed close to the base valve 222, e.g., within a threshold distance, while still providing clearance for the solenoid 118 from the vehicle attachment receptacle 104. Furthermore, the vehicle interface adapter 108 is not weakened by having material removed to accommodate the solenoid 118, such as would be the case if a cutout were formed in the vehicle interface adapter 108 to accommodate the solenoid 118. Similarly, if the lower portion of the damper were to be reduced in diameter, this would result in restriction of the hydraulic circuit due to the smaller oil column annulus and increased distance from the base valve to the solenoid valve.

In this example, as shown in cross-section, the vehicle interface adapter 108 includes a cylindrical insertion portion 250 that is inserted into the vehicle attachment receptacle 104 as shown above with respect to FIG. 1. The cylindrical insertion portion 250 may be hollow and may have a hollow tubular interior 252. The insertion portion 250 may have a first diameter 254 of a size selected to have a tolerance sufficient to enable insertion of the insertion portion 252 into the cup-shaped vehicle attachment receptacle. As one example, the first diameter 254 may be approximately the same size as a diameter of a passive damper that may also be inserted into the vehicle attachment receptacle 104, thus enabling use of the same vehicle attachment receptacle for multiple different types of dampers.

A wall 256 of the cylindrical insertion portion 250 may have a thickness T that is sufficient to support the axial and/or lateral forces applied to the damper 102 without buckling, bending, or shearing. As one example, the wall 256 of the insertion portion 250 may have a thickness T between 2 and 10 millimeters, depending at least partially on the strength of the material used to form the vehicle interface adapter 108. The vehicle interface adapter 108 may be formed of any suitable material such as metal including steel, aluminum, or various other structural materials. As one example, the vehicle interface adapter 108 may be initially forged and subsequently machined to achieve a desired configuration. In addition, while the vehicle interface adapter 108 is illustrated as being a hollow cylinder having a wall 256 with a thickness T in this example, in other examples, the wall 256 may be thicker or the cylindrical insertion portion 250 might not be hollow.

The vehicle interface adapter 108 further includes the upper perimeter 209, which has a second diameter 260 that is larger than the first diameter 254 of the cylindrical insertion portion 250, to substantially match the inner diameter of the outer tube 202 of the damper 102. As mentioned above, the upper perimeter 209 includes an upper surface 262 that serves as the bottom cap of the damper 102, and that includes the depression 228. For example, the depression 228 may be configured to accommodate the base valve 222 and the magnet 226.

In addition, the vehicle interface adapter 108 may include the one or more drainage holes 270 to enable pretreatment fluids, primer, paint, and the like, to drain from the hollow interior 252 of the vehicle interface adapter 108 during the manufacturing process of the damper 102. The one or more drainage holes 270 may be adjacent to and at approximately the level of an interior upper surface 272 of the hollow interior 252. For example, during manufacture, following assembly of the vehicle interface adapter 108 to the outer tube 202, the damper 102 may be dipped into various fluids for cleaning, priming, and painting the damper 102 with the vehicle interface adapter 108 extending in an upward direction with respect to gravity. The one or more drainage holes 270 enable the fluid retained in the hollow interior 252 of the vehicle interface adapter 108 to drain out of the hollow interior 252.

Figure 3:
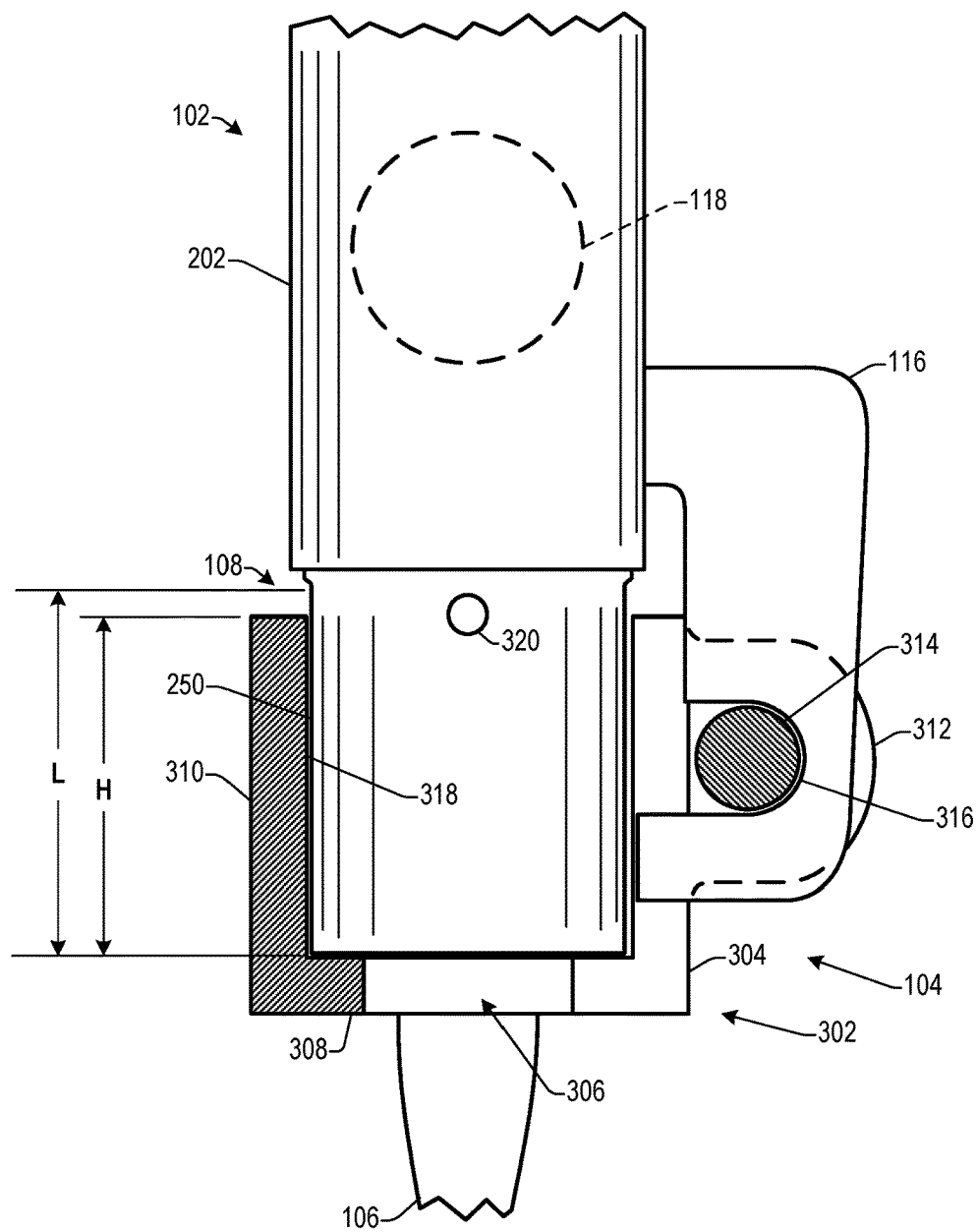
FIG. 3 illustrates an example damper and suspension attachment viewed in the direction of line 3-3 of FIG. 1 according to some implementations.

FIG. 3 illustrates an example view of the apparatus 100 of FIG. 1 viewed along line 3-3 of FIG. 1 according to some implementations. In this example, the damper 102 is assembled to the vehicle attachment receptacle 104, with the vehicle interface adapter 108 of the damper 102 inserted fully into the vehicle attachment receptacle 104. The vehicle attachment receptacle 104 is shown in cross-section to illustrate that a vertical split 302 is formed on a first side 304 of the vehicle attachment receptacle 104. Further, a circular opening 306 is formed in a bottom 308 of the cup-shaped portion 310 of the vehicle attachment receptacle 104 to enable the cup-shaped portion 310 of the vehicle attachment receptacle 104 to flex for clamping the insertion portion 250 of the vehicle interface adapter 108 when the insertion portion 250 of the vehicle interface adapter 108 is inserted into the cup-shaped portion 310 of the vehicle attachment receptacle 104.

The first side 304 of the vehicle attachment receptacle 104 further includes a pair of clamping lugs 312, one of which is shown in this view in partial hidden lines. After the insertion portion 250 of the vehicle interface adapter 108 is inserted into the cup shaped portion 310 of the vehicle attachment receptacle 104, a bolt 314 (illustrated in cross-section in this example) may be inserted through holes in the clamping lugs 312 and a hole 316 in the retention lug 116 of the damper 102. The bolt will not enter the hole 316 in the retention lug 116 unless the vehicle interface adapter 108 is fully inserted and bottomed out in the cup-shaped portion 310, which results in the hole 316 being properly aligned with the holes in the clamping lugs 312. Thus, a length L of the insertion portion 252 that extends beyond the first end 110 of the outer tube 202 is greater than a height H of a wall 318 on the interior of the cup-shaped portion 310.

In addition, the vehicle interface adapter 108 may include the one or more drainage holes 270 to enable pretreatment fluids and paint to drain from the hollow interior of the vehicle interface adapter 108 during the manufacturing process of the damper 102. For example, during manufacture, following assembly of the vehicle interface adapter 108 to the outer tube as discussed above with respect to FIG. 2, the damper 102 may be dipped into various fluids for priming and painting the damper 102. The one or more drainage holes 270 enable the fluid in a fluid retained in the hollow portion of the vehicle interface adapter 108 to drain out.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A damper comprising:
    an outer tube;
    an inner tube mounted within the outer tube to form an annular outer chamber between the outer tube and the inner tube;
    an intermediate tube sealed to the inner tube to form an intermediate annular chamber between the intermediate tube and the inner tube;
    a piston reciprocally mounted in an interior of the inner tube, wherein the interior of the inner tube includes an inner chamber in fluid communication with the intermediate annular chamber;
    a base valve that regulates fluid flow between the annular outer chamber and the inner chamber;
    a solenoid valve operable by a solenoid, the solenoid valve in fluid communication with the annular outer chamber and the annular intermediate chamber to control a pressure level in the inner chamber; and
    a vehicle interface adapter sealing a first end of the outer tube, the vehicle interface adapter including a cylindrical insertion portion extending outward from the first end of the outer tube for insertion into a cup-shaped portion of a vehicle attachment receptacle, the cylindrical insertion portion having a cylindrical wall forming a cylinder that is aligned coaxially with the outer tube.

2. The damper as recited in claim 1, wherein the cylindrical insertion portion has a length greater than a height of a wall of the cup-shaped portion of the vehicle attachment receptacle to provide clearance for the solenoid.

3. The damper as recited in claim 1, wherein:
    a diameter of the cylindrical insertion portion is sized to be less than a diameter of the cup-shaped portion prior to clamping of the cup-shaped portion to clamp the cylindrical insertion portion within the cup-shaped portion; and
    a diameter of the outer tube is greater than a diameter of the cup-shaped portion prior to clamping of the cup-shaped portion.

4. The damper as recited in claim 1, wherein the cylindrical insertion portion has a hollow interior and includes the cylindrical wall having a wall thickness between 2 and 10 millimeters.

5. The damper as recited in claim 4, further comprising at least one drainage hole formed through the cylindrical wall adjacent to an inner upper surface of the hollow interior of the cylindrical insertion portion.

6. The damper as recited in claim 1, further comprising a depression formed in an upper surface of the vehicle interface adapter for receiving the base valve.

7. The damper as recited in claim 1, further comprising a retention lug disposed on an exterior of the outer tube, the retention lug including a hole positioned to align with holes in clamping lugs on the vehicle attachment receptacle when the cylindrical insertion portion is fully inserted into the vehicle attachment receptacle.

8. A damper comprising:
    an outer tube;
    a piston reciprocally mounted on an interior of the outer tube;
    a dampening force generating mechanism mounted on the outer tube within a threshold distance from a first end of the outer tube to control a dampening property of the piston;
    a vehicle interface adapter sealing the first end of the outer tube, the vehicle interface adapter including an insertion portion extending outward from the first end of the outer tube and able to be inserted into a cup-shaped portion of a vehicle attachment receptacle; and
    a retention lug disposed on an exterior of the outer tube, the retention lug including a hole positioned to align with holes in clamping lugs on the vehicle attachment receptacle when the insertion portion is fully inserted into the vehicle attachment receptacle.

9. The damper as recited in claim 8, wherein the dampening force generating mechanism comprises a solenoid valve and a solenoid extending from one side of the outer tube.

10. The damper as recited in claim 8, wherein the insertion portion has a length greater than a height of a wall of the cup-shaped portion of vehicle attachment receptacle to provide clearance for the solenoid.

11. The damper as recited in claim 8, wherein:
    the insertion portion is cylindrical; and
    the insertion portion has a hollow interior and includes a cylindrical wall having a wall thickness between 2 and 10 millimeters.

12. The damper as recited in claim 11, further comprising at least one drainage hole formed through the cylindrical wall adjacent to an inner upper surface of the hollow interior of the cylindrical insertion portion.

13. A damper comprising:
    an outer tube;
    a piston reciprocally mounted on an interior of the outer tube;
    a solenoid valve operable by a solenoid to control a dampening property of the piston; and
    a vehicle interface adapter sealing a first end of the outer tube, the vehicle interface adapter including a cylindrical insertion portion extending outward from a first end of the outer tube for insertion into a cup-shaped portion of a vehicle attachment receptacle, the cylindrical insertion portion having a cylindrical wall forming a cylinder that is aligned coaxially with the outer tube.

14. The damper as recited in claim 13, wherein the vehicle interface adapter includes an upper surface with a depression formed in the upper surface, the damper further including a base valve located in the depression for regulating fluid flow between a piston chamber and the solenoid valve, wherein the base valve is within a threshold distance from the solenoid valve.

15. The damper as recited in claim 13, wherein the cylindrical insertion portion has a length greater than a height of a wall of the cup-shaped portion of vehicle attachment receptacle to provide clearance for the solenoid.

16. The damper as recited in claim 13, wherein the cylindrical insertion portion is hollow and includes the cylindrical wall having a wall thickness between 2 and 10 millimeters.

17. The damper as recited in claim 13, further comprising at least one drainage hole formed through the cylindrical wall adjacent to an inner upper surface of a hollow interior of the cylindrical insertion portion.

18. The damper as recited in claim 13, wherein:
   a diameter of the cylindrical insertion portion is sized to be less than a diameter of the cup-shaped portion prior to clamping of the cup-shaped portion to clamp the cylindrical insertion portion within the cup-shaped portion; and
   a diameter of the outer tube is greater than a diameter of the cup-shaped portion prior to clamping of the cup-shaped portion.

19. The damper as recited in claim 13, further comprising a retention lug disposed on an exterior of the outer tube, the retention lug including a hole positioned to align with holes in clamping lugs on the vehicle attachment receptacle when the vehicle interface adapter is fully inserted into the vehicle attachment receptacle.

\* \* \* \* \*